US007466498B2

(12) United States Patent
Saito et al.

(10) Patent No.: US 7,466,498 B2
(45) Date of Patent: Dec. 16, 2008

(54) EXPOSURE DEVICE

(75) Inventors: Kenichi Saito, Kanagawa (JP); Toshiro Hayakawa, Kanagawa (JP); Kenji Matsumoto, Kanagawa (JP); Yoshinori Morimoto, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 1207 days.

(21) Appl. No.: 10/807,404

(22) Filed: Mar. 24, 2004

(65) Prior Publication Data

US 2004/0238761 A1 Dec. 2, 2004

(30) Foreign Application Priority Data

Mar. 25, 2003 (JP) ............................ 2003-082115

(51) Int. Cl.
*G02B 9/08* (2006.01)

(52) U.S. Cl. ...................................... 359/738; 359/739

(58) Field of Classification Search ................. 359/738, 359/739, 740
See application file for complete search history.

(56) References Cited

FOREIGN PATENT DOCUMENTS

| | | | | |
|---|---|---|---|---|
| JP | 11-58829 | A | | 3/1999 |
| JP | 2001076370 | A | * | 3/2001 |

* cited by examiner

*Primary Examiner*—Scott J Sugarman
(74) *Attorney, Agent, or Firm*—Sughrue Mion, PLLC

(57) ABSTRACT

In an exposure device, a beam emitted from a light emitting point of a laser diode (LD) is limited by a slit. The slit limits a light beam in a direction orthogonal to an active layer of the LD. The exposure device has a moving mechanism which moves a plate in which the slit is provided, in a direction orthogonal to the plate. Object points are different at a beam and at flare light. Therefore, the plate is provided in a vicinity of the light emitting point in order to limit the light beam in the vicinity of the light emitting point, i.e., at a place near a point where a beam spot is smallest, and to be able to effectively block only the flare light.

17 Claims, 11 Drawing Sheets

EXPOSURE DEVICE

CROSS-REFERENCE TO RELATED APPLICATION

This application claims priority under 35 USC 119 from Japanese Patent Application No. 2003-082115, the disclosure of which is incorporated by reference herein.

BACKGROUND OF THE INVENTION

1. Technical Field

The present invention relates to an exposure device.

2. Description of the Related Art

Conventionally, in a semiconductor laser which emits light in the red to infrared region where the wavelengths are long, beam reshaping is carried out either by disposing a light beam limiting device (an aperture) after a coupling lens which converts the beam emitted from the laser crystal into substantially parallel light or converged light, or by limiting the light beam at the opening of the coupling lens.

In GaN semiconductor lasers, which emit blue light and which have been put into practical use in recent years, a material such as sapphire or SiC (silicon carbide) or the like which does not absorb blue light is used as the substrate.

Therefore, phenomena arise such as the reflected light reflected at the interior of the LD chip which emits the light becomes stray light and is discharged to the exterior, or returns to a vicinity of the active region and affects the state of oscillation of the laser, or the like. Therefore, problems arise in that the beam quality in the direction perpendicular to the PN coupling plane of the LD chip is poor, and a sufficient extinction ratio cannot be achieved. As a result, when this blue semiconductor laser is used as a light source for exposure, the image quality deteriorates. When this blue semiconductor laser is used as a light source for reading at a recording device or the like, it becomes a cause of erroneous detection.

Further, when this blue semiconductor laser is used as an exposure light surface of an image recording device which records an image by modulating the exposure intensity in accordance with an image signal, sufficient contrast cannot be obtained because the extinction ratio is insufficient.

As shown in FIG. 12A, a beam 110 emitted from an LD 102 is made into parallel light at a coupling lens 104, and is focused at a focal point 108 by a lens 106. Here, the stray light from the interior of the LD 102 becomes flare light 112. The beam quality in the direction orthogonal to the PN coupling plane of the LD 102 (i.e., in the direction of arrow V) deteriorates, and sufficient contrast cannot be achieved.

As shown in FIG. 12B, even if the flare light 112 is limited by inserting a slit formed on a plate 114 after the coupling lens 104, the object point of the flare light 112 is, differently from the light emitting point of the laser, not at the surface of the LD but rather at the interior of the LD. Therefore, the flare light 112 passes through the opening of the slit 114. It is difficult to eliminate only the flare light 112.

Moreover, as shown in FIG. 12C, a mechanism has been conceived of in which a portion of the beam is guided by a beam splitter 116 to a sensor 118 where the light amount is detected, and the driving voltage of the LD 102 is feedback-controlled at a controller 120. The light amount of the LD 102 is therefore monitored in real time in order to stabilize the light amount of the beam. However, at this time as well, flare light, which is not received at the light-receiving surface of the sensor 118 exists. Therefore, the relationship between the light amount at the image surface and the amount of light received at the sensor 118 is not linear, and the linearity thereof is lost.

Structures have conventionally been disclosed in which a diaphragm is fixed to the laser light source by an adhesive or the like, and the angle of the opening of the diaphragm with respect to the laser light source is fixed. (See, for example, Japanese Patent Application Laid-Open (JP-A) No. 11-58829 (page 1 and FIG. 1)). However, this is a structure which accurately maintains the angles between the positions of the light emitting points and the diaphragm opening when using an LD having plural light emitting points, and is not a countermeasure with respect to stray light.

SUMMARY OF THE INVENTION

In view of the aforementioned, an object of the present invention is to provide an exposure device which has excellent beam quality and a sufficient extinction ratio.

A first aspect of the present invention is an exposure device using a GaN blue semiconductor laser as a light source, wherein a first limiting device, which limits a light beam which passes through, is provided between an active layer of the semiconductor laser and a coupling lens which is nearest to the active layer, and a limiting direction of the first limiting device is a direction orthogonal to the active layer of the semiconductor laser.

In the invention having the above-described structure, in the direction orthogonal to the active layer, the object points arising at the laser light and the stray light are different, and are at the crystal surface and at the crystal interior, respectively. Therefore, by providing the limiting device at a place near to the light emitting point of the laser light, i.e., the place where the beam spot is the smallest, and limiting the light beam, the stray light can be separated and blocked.

In the exposure device of the first aspect of the present invention, the first limiting device may be relatively movable in the limiting direction to the light source.

In the invention having the above-described structure, by making the slit or the like which is the limiting device movable in the limiting direction, i.e., in the direction orthogonal to the active layer, the slit or the like can be provided at the optimal position. Alternatively, the light source will be movably installed when the limiting device is unmovably fixed.

In the exposure device of the first aspect of the present invention, a second limiting device, which limits a light beam which passes through, may be provided after the coupling lens, and a limiting direction of the second limiting device may be a direction along the active layer of a laser crystal.

In the present invention having the above-described structure, the configuration of the collected beam at the time when an LED emits light, which is not problematic at the time when a laser oscillates, is reshaped, and can be made to be a more ideal configuration.

In the exposure device of the first aspect of the present invention, the second limiting device may be movable in the limiting direction.

In the invention having the above-described structure, by making the slit or the like which is the limiting device movable in the limiting direction, i.e., the direction along the active layer, the slit or the like can be provided at the optimal position.

In the exposure device of the first aspect of the present invention, given that a width of an opening of the first limiting device in the limiting direction is D, a distance from a light emitting surface of the active layer to the first limiting device is L, and a spread angle of a beam from the light emitting surface is $\alpha$, the exposure device may be structured so as to satisfy: $D/\{2L \circ \tan(\alpha/2)\} \leqq 2.0$.

In the invention having the above-described structure, if the vignetting rate t of the beam due to the slit is t=D/W and if $W=2L \circ \tan(\alpha/2)$, by keeping the vignetting rate down to $t \leqq 2.0$, the side lobe intensity (an unnecessary component) of the beam can be kept down to 3 to 4%.

A second aspect of the present invention is an exposure device using a GaN blue semiconductor laser as a light source, wherein, given that a numerical aperture of a coupling lens nearest to a light emitting surface of an active layer of the blue semiconductor laser is NA and a spread angle of a beam from the light emitting surface is $\alpha$, the exposure device is structured so as to satisfy: $NA \circ \tan(\alpha/2) \leqq 2.0$.

In the invention having the above-described structure, instead of separately providing a limiting device such as a slit, the light beam can be limited by limiting the numerical aperture of the coupling lens which is nearest to the light emitting surface of the active layer.

A third aspect of the present invention is an exposure device which uses a GaN blue semiconductor laser as a light source, and which forms an image by irradiated light irradiated from the GaN blue semiconductor laser onto a photosensitive material using a silver halide, and which carries out gradation expression of the image by controlling a driving current of the GaN blue semiconductor laser and modulating an emission intensity of the irradiated light, wherein a first limiting device, which limits a light beam which passes through, is provided between a light emitting point of the GaN blue semiconductor laser and a coupling lens which is nearest to the light emitting point, a limiting direction of the first limiting device is a direction orthogonal to an active layer of the GaN blue semiconductor laser, and given that a width of an opening of the first limiting device in the limiting direction is D, a distance from a light emitting surface of the active layer to the first limiting device is L, and a spread angle of a beam from the light emitting point is a, the exposure device is structured so as to satisfy: $D/\{2L \circ \tan(\alpha/2)\} \leqq 1.8$.

In the invention having the above-described structure, the dynamic range of the exposure light amount, which is needed in order to achieve the contrast required at the time of reproducing a photographic image by using a general silver salt photosensitive material, can be ensured to be about 1.5 by eliminating stray light at a limiting device such as a slit or the like.

A fourth aspect of the present invention is an exposure device which uses a GaN blue semiconductor laser as a light source, and which forms an image by irradiated light irradiated from the GaN blue semiconductor laser onto a photosensitive material using a silver halide, and which carries out gradation expression of the image by controlling a driving current of the GaN blue semiconductor laser and modulating an emission intensity of the irradiated light, wherein given that a numerical aperture of a coupling lens nearest to a light emitting point of an active layer of the GaN blue semiconductor laser is NA and a spread angle of a beam from the light emitting point is $\alpha$, the exposure device is structured so as to satisfy: $NA \circ \tan(\alpha/2) \leqq 1.8$.

In the invention having the above-described structure, the dynamic range of the exposure light amount, which is needed in order to achieve the contrast required at the time of reproducing a photographic image by using a general silver salt photosensitive material, can be ensured to be about 1.5 by eliminating stray light by limiting the numerical aperture of the coupling lens which is nearest to the light emitting surface.

The exposure device of the third or fourth aspect of the present invention may be structured such that a predetermined driving current is always continuously applied to the GaN blue semiconductor laser, and even in a state in which there is no image signal, the GaN blue semiconductor laser emits light in an LED region.

In the invention having the above-described structure, by always applying driving current to the GaN blue semiconductor laser, the GaN blue semiconductor laser is in a state of oscillating and emitting light, and the responsiveness at the time of input of the image signal, i.e., the rising characteristic, can be improved.

DETAILED DESCRIPTION OF THE INVENTION

Figure 1:
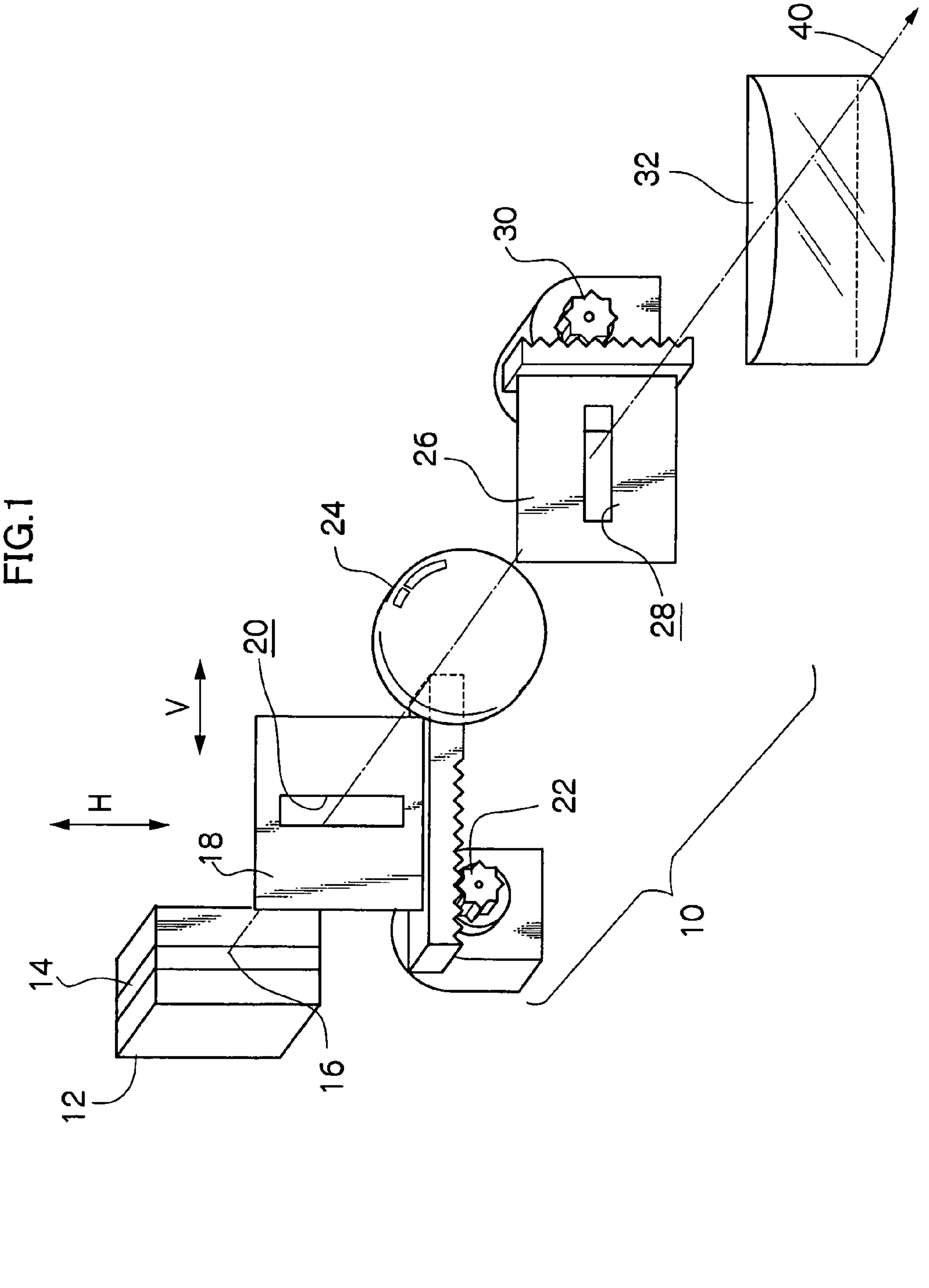
FIG. 1 is a perspective view of an exposure device relating to a first embodiment.

A perspective view of an exposure device relating to a first embodiment is shown in FIG. 1.

As shown in FIG. 1, in an exposure device 10, a beam 40 irradiated from a light emitting point 16 of a laser diode (hereinafter, "LD") 12 is first limited by a first slit 20 formed in a first slit plate 18. At this time, the first slit 20 limits the light beam in a direction (the direction of arrow V) orthogonal to an active layer 14 of the LD 12. A moving mechanism 22 which can move the first slit plate 18 in the direction of arrow V is provided. As shown in FIG. 1, the moving mechanism 22 has a mechanism formed from a driving device combining a stepping motor with a rack-and-pinion gear. Or, as a simpler mechanism, the moving mechanism 22 may have a long hole in the direction of arrow V, and the first slit plate 18 may be movable in the direction of arrow V along this long hole, and held at an appropriate position by screws. At this time, the positional reproducibility is improved if a scale is formed at the long hole.

The beam 40, from which stray light has been removed by the first slit 20, passes through a coupling lens (hereinafter, "CL") 24 and becomes parallel light, and is guided to a second slit 28.

The second slit 28, which is provided in a second slit plate 26, limits the light beam in the direction (the direction of arrow H) along the active layer 14 of the LD 12. A moving mechanism 30, which can move the second slit plate 26 along the direction of arrow H is provided. As shown in FIG. 1, the moving mechanism 30 as well has a mechanism formed from a driving device combining a stepping motor with a rack-and-pinion gear. Or, as a simpler mechanism, the moving mechanism 30 may have a long hole in the direction of arrow H, and the second slit plate 26 may be movable in the direction of arrow H along this long hole and held at an appropriate position by screws.

The beam 40 which is reshaped by the second slit 28 is connected with a focal point on an unillustrated image surface by a second lens 32.

A side view showing the effects of the first slit relating to the first embodiment is shown in FIG. 2.

Figure 2A:
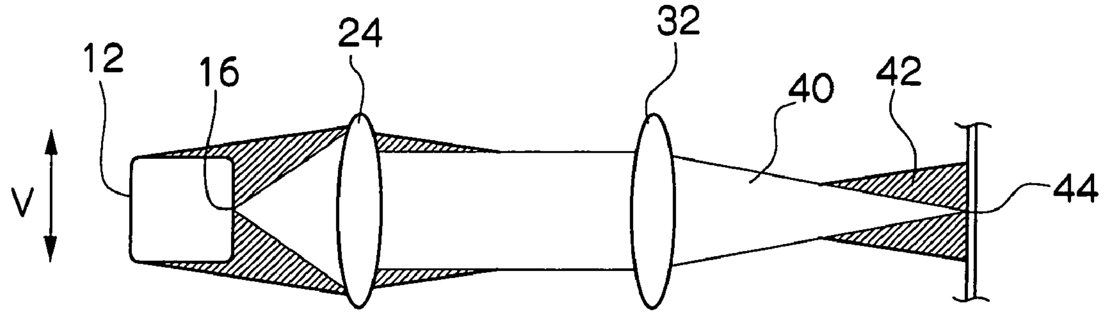
FIGS. 2A and 2B are side views of the exposure device relating to the first embodiment.

In FIG. 2A, the first slit 20 is not provided. Therefore, flare light 42, which is reflected within the LD 12, reaches a vicinity of a focal point 44, and the beam quality deteriorates.

Figure 2B:
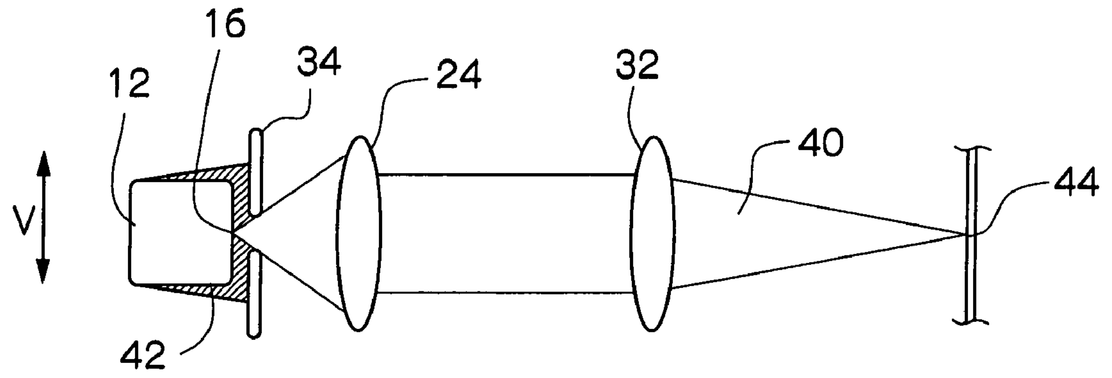

In contrast, in FIG. 2B, the first slit plate 18 is provided in a vicinity of the light emitting point 16, and limits the light beam. At this time, because the object points are different at the beam 40 and the flare light 42, if the light beam can be limited in a vicinity of the light emitting point 16, i.e., at a place near the point where the beam spot is the smallest, it is possible to effectively block only the flare light 42 as shown in FIG. 2B.

The improvement in the beam quality resulting therefrom is shown in FIG. 3.

A graph showing the effects of the first slit relating to the first embodiment is shown in FIG. 3.

Figure 3A:
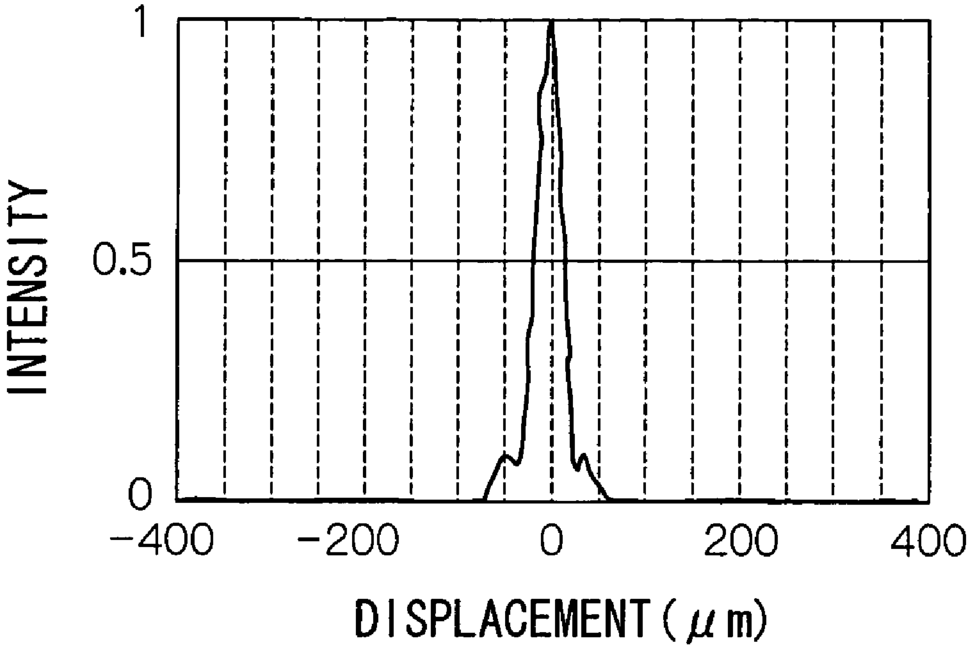
FIGS. 3A and 3B are diagrams showing the results of a first slit relating to the first embodiment.
Figure 3B:
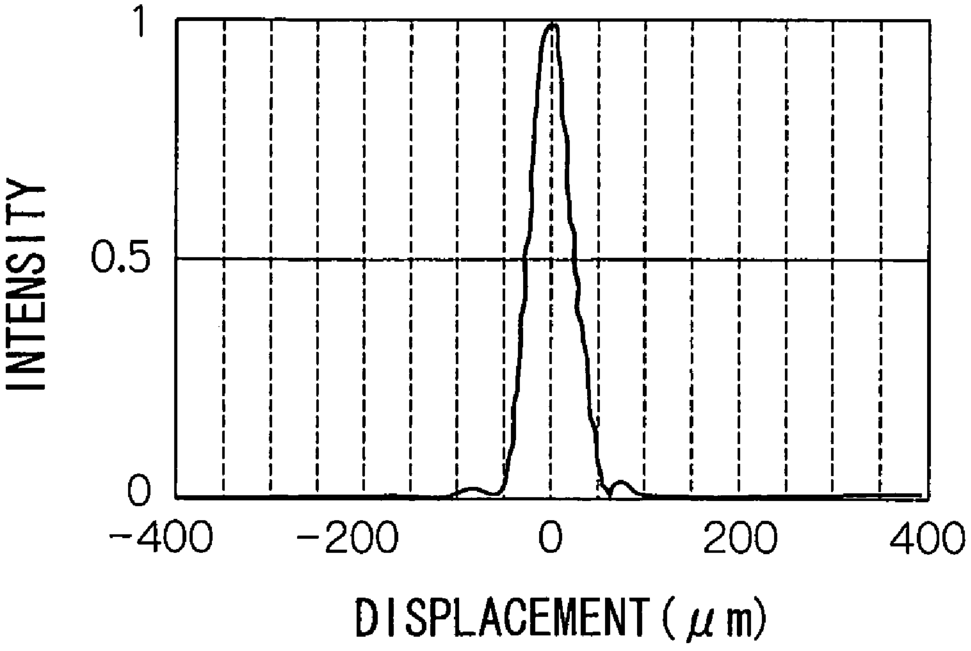

FIGS. 3A and 3B illustrate the distance from the optical axis and the intensity of the laser light, in a case in which the first slit 20 having a slit width of 0.5 mm is not provided, and in a case in which such a first slit 20 is provided. The horizontal axis shows the distance (μm) from the optical axis, and the vertical axis shows the intensity of the laser light.

In FIG. 3A, the first slit 20 is not provided, and, from the LD 12 to the CL 24, there is no means for blocking the stray light. Therefore, the flare light 42 which is an unnecessary component, i.e., side lobe intensity, of about 10% exists.

In FIG. 3B, the first slit 20 having a slit width of 0.5 mm is provided, and the flare light 42 is blocked in a vicinity of the light emitting point 16 as shown in FIG. 2B. Therefore, the side lobe intensity is kept down to about 3%.

In this case, due to the limiting by the first slit 20, side lobes do arise due to the refractive effect of the vignetting. However, the flare light 42 generated within the LD is effectively blocked, and as a result, the beam quality improves as shown in FIG. 3B.

Here, given that the width of the first slit 20 is D, the spread angle of the beam emitted from the LD 12 is α and the distance between a light emitting surface of an active layer of the LD 12 and the first slit 20, a beam width W at the position of the slit is:

$$W=2L\circ\tan(\alpha/2)$$

At this time, a vignetting rate t at the first slit 20 is:

$$t=D/W$$

Fluctuations in the beam quality when the vignetting rate t is varied from 2.4 to 1.8 are shown in FIGS. 4A through 4D. Intensity is plotted on the vertical axis, and the distance from the optical axis is plotted on the horizontal axis. The main beam intensity appears at the center, and side lobe intensity, which is an unnecessary light component, appears at both sides of the main peak.

Figure 4A:
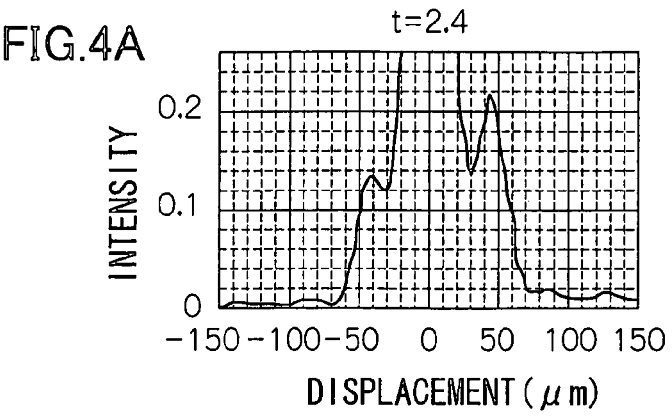
FIGS. 4A, 4B, 4C and 4D are diagrams showing the results of the first slit relating to the first embodiment.
Figure 4B:
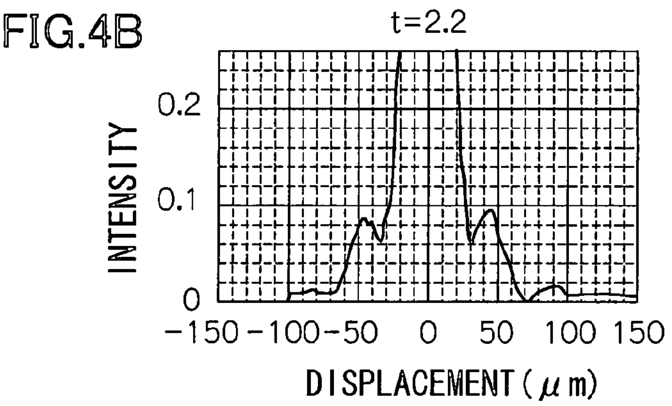
Figure 4C:
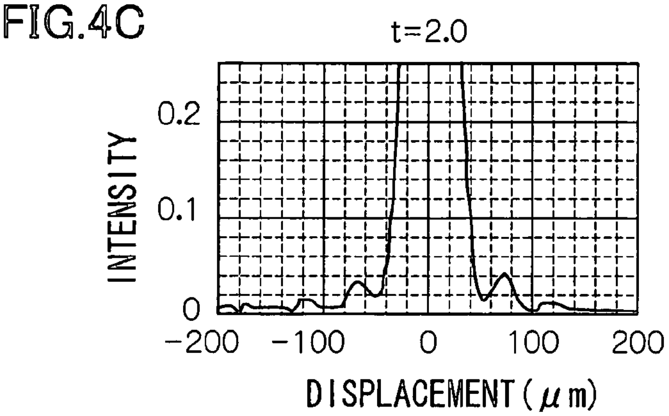
Figure 4D:
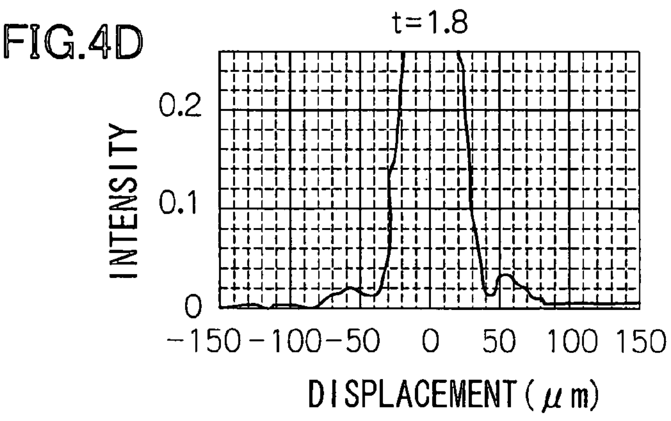

In FIG. 4A, at a vignetting rate of t=2.4, the side lobe intensity is about 22%. In contrast, in FIG. 4B, at a vignetting rate of t=2.2, the side lobe intensity decreases to about 9%. In FIG. 4C, at a vignetting rate of t=2.0, the side lobe intensity can be reduced to about 3%. However, in FIG. 4D, at a vignetting rate of t=1.8, the side lobe intensity is still about 3%, and no improvement can be seen over the case shown in FIG. 4C where t=2.0.

From this, it can be understood that the vignetting rate of the slit which is effective in reducing the side lobe intensity is t≦2.0. The present embodiment is characterized in being structured so as to satisfy the following relationship as the setting of a slit width which reduces the side lobe intensity but does not reduce the intensity of the main beam:

$$t=D/W=D/\{2L\circ\tan(\alpha/2)\}\leqq 2.0$$

Further, as the light beam limiting device, in place of providing the first slit 20, the numerical aperture (NA) of the CL 24 may be limited. At this time, because $$NA=D/2L,$$

the object of the present application can be achieved by a structure satisfying the relationship:

$$NA/\tan(\alpha/2)\leqq 2.0$$

In a case in which the focal length of the CL 24 is about several mm, the beam diameter at the first slit 20 is about 0.5 to 1.0 mm which is extremely small, and the slit width D of the first slit 20 also is about 0.5 mm. Therefore, in order to obtain a beam which has left-right symmetry with respect to the optical axis and whose side lobes are small, the relative positions of the first slit 20 and the beam optical axis must be adjusted at a precision of units of 10 μm. In the present embodiment, the position of the first slit 20 can be adjusted by structuring the first slit plate 18 to be able to be moved by the moving mechanism 22 in the direction of limiting the light beam.

Figure 5A:
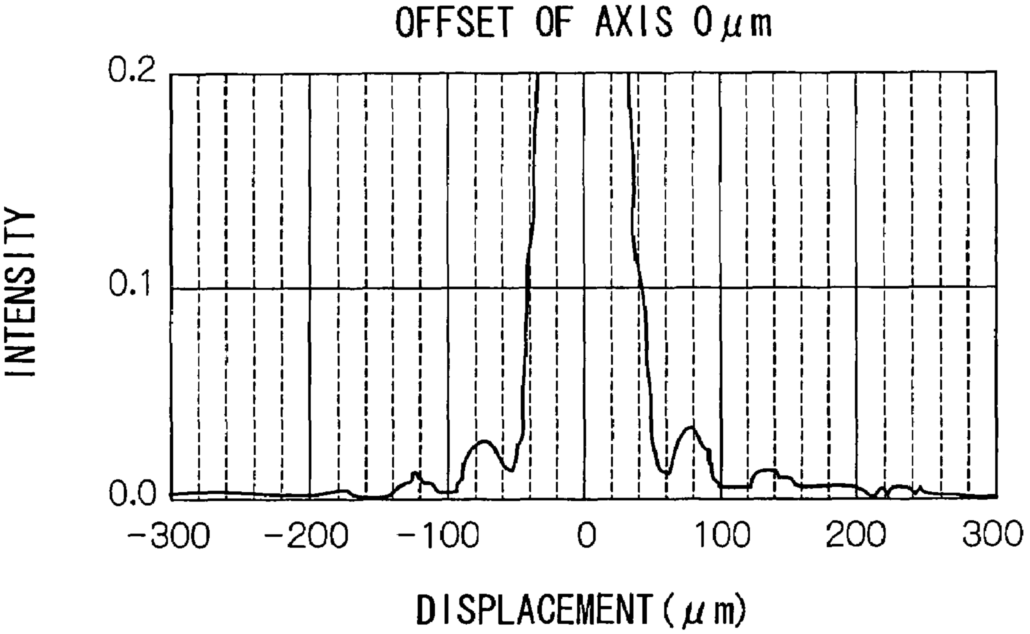
FIGS. 5A and 5B are diagrams showing the influence of positional offset of a light beam limiting device relating to the first embodiment.
Figure 5B:
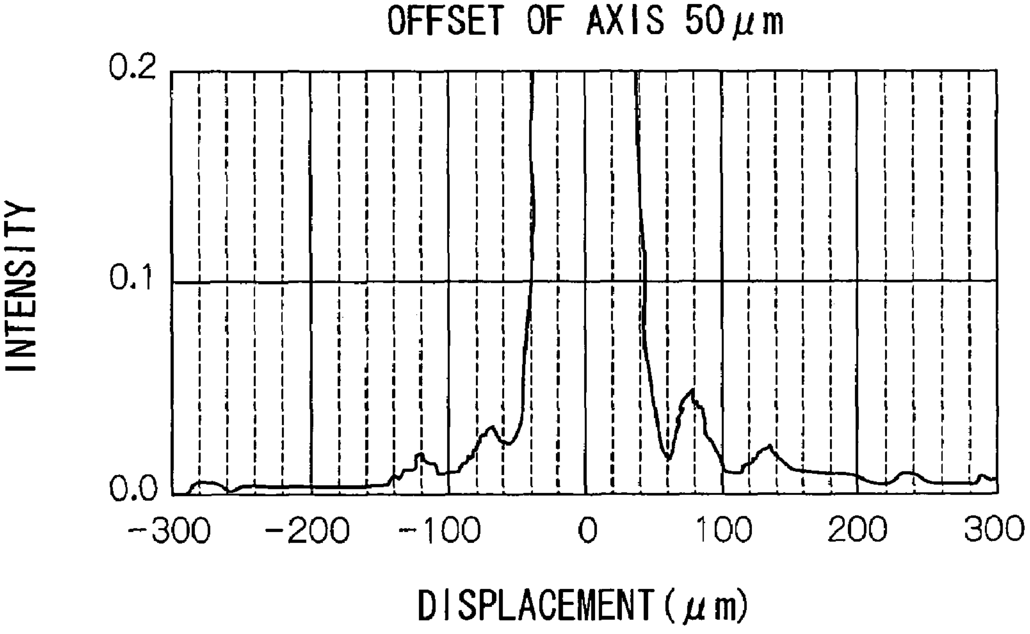

For example, as shown in FIG. 5, in a case in which the center of the first slit 20 is offset from the optical axis, even at an amount of offset of about 50 μm, the side lobe intensity increases and the beam quality deteriorates. FIG. 5A illustrates a case in which the amount of offset is 0 μm, whereas in FIG. 5B in which the amount of offset is 50 μm, the side lobe intensity increases from about 3% to about 5%.

A graph showing the effects of the second slit relating to the first embodiment is shown in FIG. 6.

The beam quality of the beam 40 emitted from the LD 12 can be maintained by restricting the placement of the first slit 20 with respect to the laser oscillation region, or by restricting the numerical aperture of the CL 24. With such light beam limiting devices, the beam configuration at the time when an LED emits light cannot be reshaped. The intensity of the beam at the time when an LED emits light is relatively weak as compared with that of a laser at the time when the laser is oscillated. Therefore, it is no longer possible to ignore the effects of the stray light which previously could be ignored.

Figure 6A:
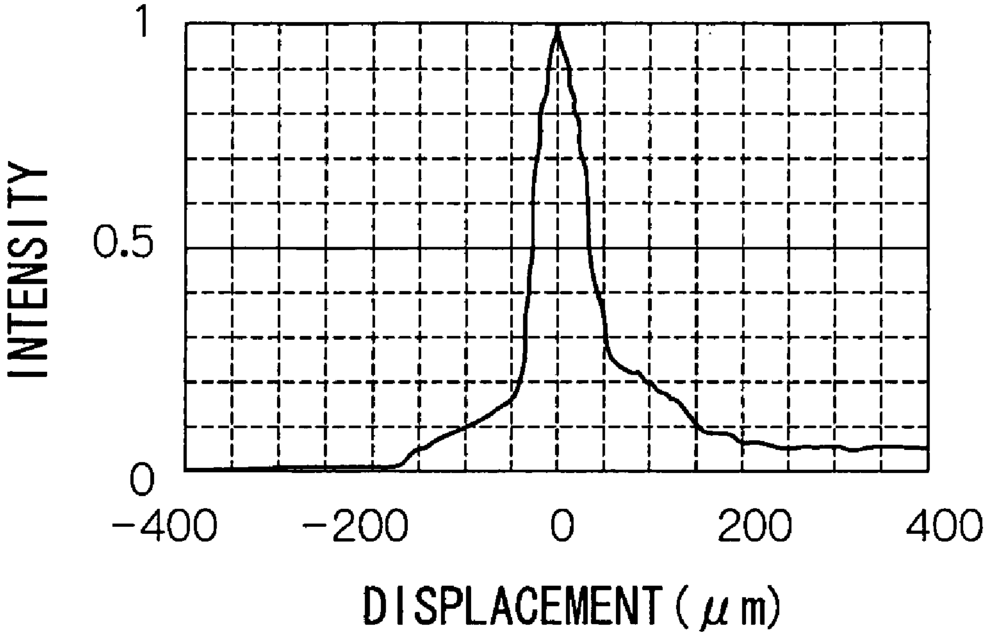
FIGS. 6A and 6B are diagrams showing the results of a second slit relating to the first embodiment.
Figure 6B:
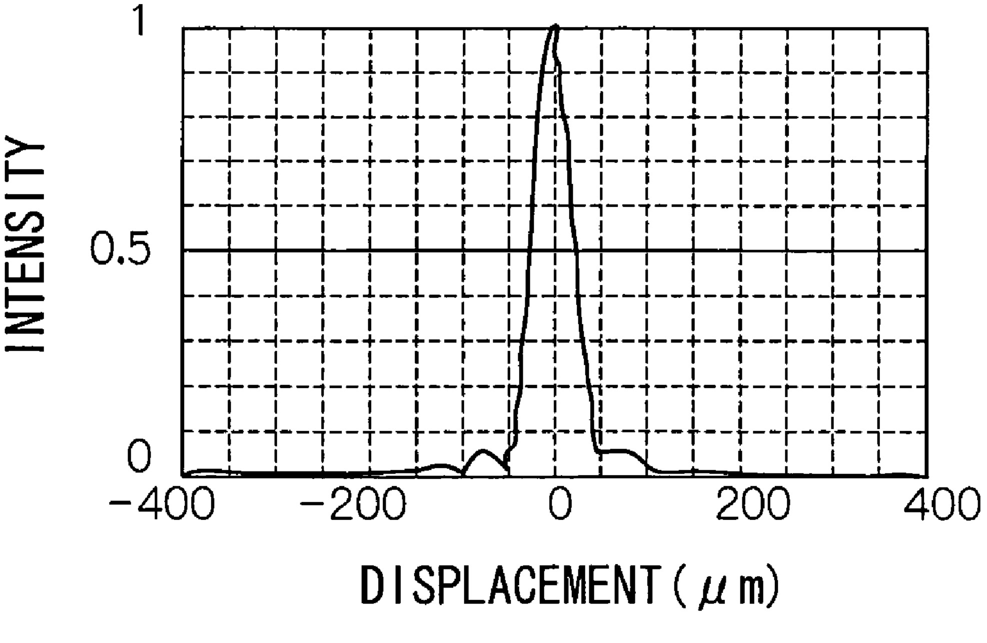

Namely, in a case in which no light beam limiting device is provided from the CL 24 on, the intensity distribution is such as that illustrated in FIG. 6A. Because the side lobe intensity reaches as much as 20%, a good beam quality cannot be obtained. Therefore, in the present embodiment, the second slit 28 is provided between the CL 24 and the second lens 32, and reshaping of the beam is carried out. Here, when the opening width D of the first slit is 0.5 mm and the focal length of the CL 24 is 8.0 mm, by inserting the second slit 28 which has an opening width of 1 to 2 mm, the side lobe intensity can be kept down to 5% or less as shown in FIG. 6B.

Further, with regard to the second slit 28 as well, in the same way as with the first slit 20, by structuring the second slit plate 26 to be able to be moved in the limiting direction (the direction of arrow H) by the moving mechanism 30, the position of the second slit 28 can be adjusted.

Because the present embodiment is structured as described above, it is possible to provide an exposure device having excellent beam quality and a sufficient extinction ratio.

Further, also in cases in which, in order to stably drive the LD, the light amount of the beam is monitored by a sensor in real time and feedback control is carried out, because the stray light which affects the sensor can be cut, more accurate driving control can be carried out.

Figure 7:
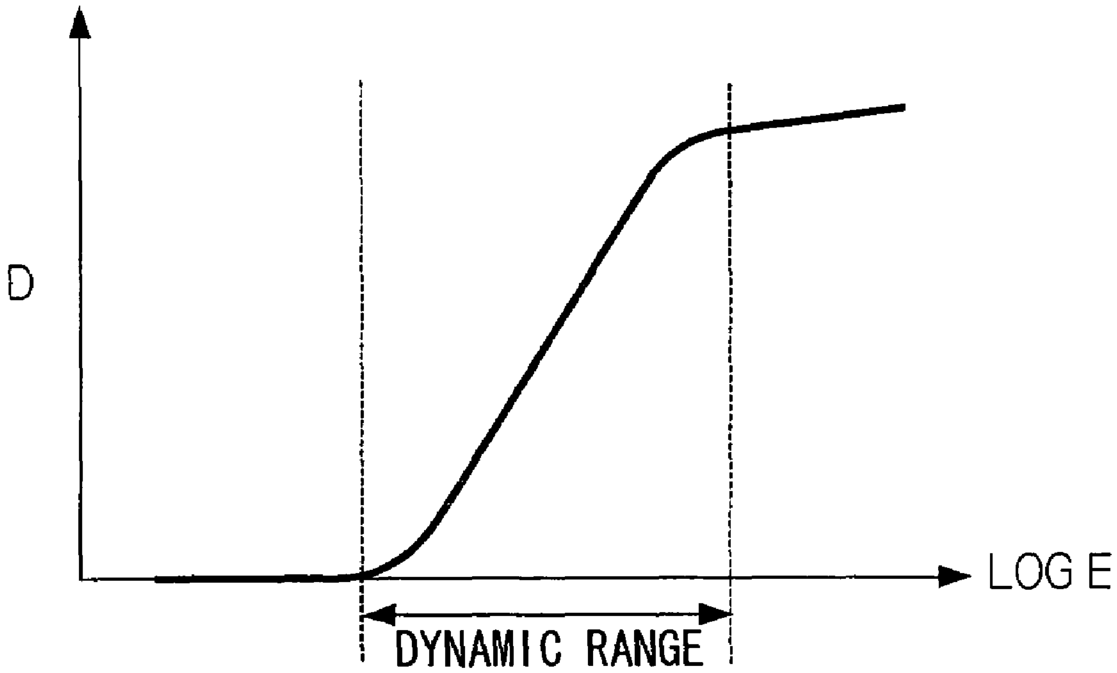
FIG. 7 is a characteristic curve diagram showing the characteristic of a general silver salt photosensitive material.

A characteristic curve of a general silver salt photosensitive material is shown in FIG. 7.

In a silver salt photosensitive material, the color forming density D varies as shown along the vertical axis, with respect to the incident light amount logE shown on the horizontal axis. Therefore, in order to obtain a good image, a dynamic range, which is the difference between light and dark in the exposure light amount, must be ensured. The dynamic range of the exposure light amount needed in order to reproduce the contrast needed for a photographic image is generally about 1.5.

Therefore, the second embodiment of the present application presupposes use of a silver salt photosensitive material, and an object of the present second embodiment is to ensure a dynamic range of the exposure light amount of 1.5.

Graphs showing the effects of a first slit relating to the second embodiment are shown in FIG. 8.

Figure 8A:
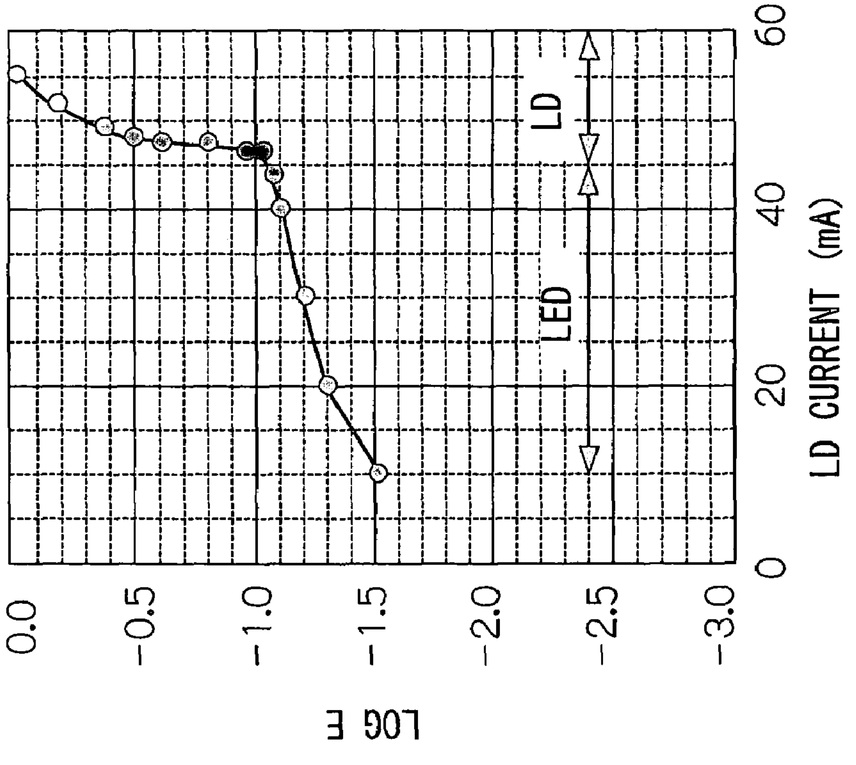
FIGS. 8A and 8B are diagrams showing the results of a first slit relating to a second embodiment.

The relationship between the light amount and the driving current supplied to the LD 12 in an exposure device not having the first slit 20 is shown in FIG. 8A. In this case, because the first slit 20 does not exist, there is much stray light, and there is therefore a large amount of light in the LED light emitting region. Thus, in the laser oscillating region, a dynamic range of only about 1.0 can be maintained.

Moreover, the maximum driving voltage cannot actually be used due to the life of the LD 12 and the danger of breakage thereof and the like. Therefore, the actual dynamic range is even more narrow.

In contrast, in the present embodiment, the first slit 20 is provided between the LD 12 and the CL 24. By limiting the light beam at a position near to the light emitting point 16 of the LD 12, the stray light can be blocked, and the amount of light in the LED light emitting region can be reduced overall. As a result, the dynamic range from the laser oscillating region to the LED light emitting region can be enlarged.

Figure 8B:
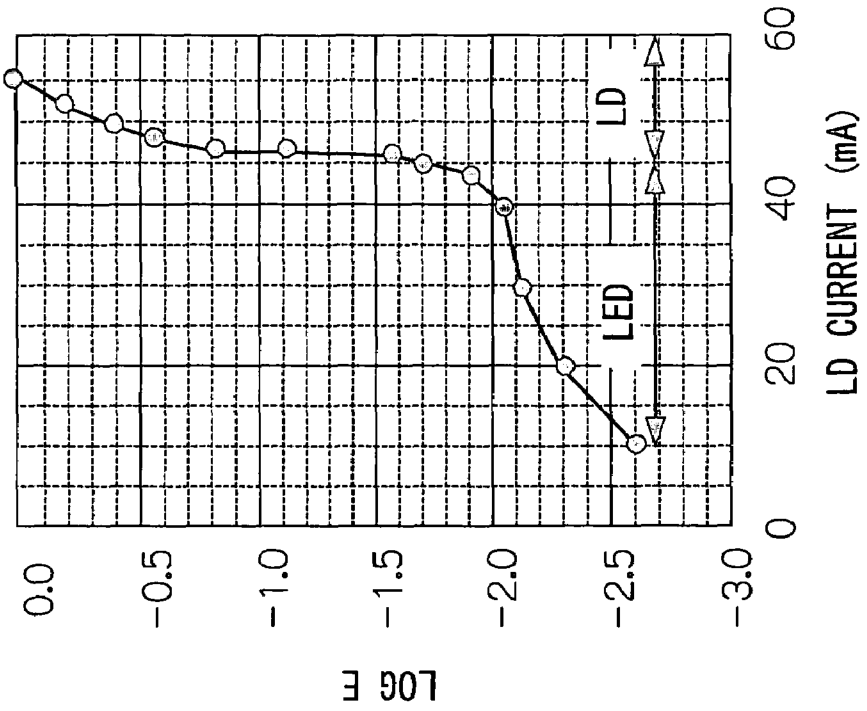

In a case in which the stray light is blocked by using the first slit 20, as shown in FIG. 8B, the amount of light in the LED light emitting region is greatly reduced, and the dynamic range can be enlarged by about one digit.

Specific numerical values relating to the effects of the first slit 20 will be described hereinafter.

Figure 9:
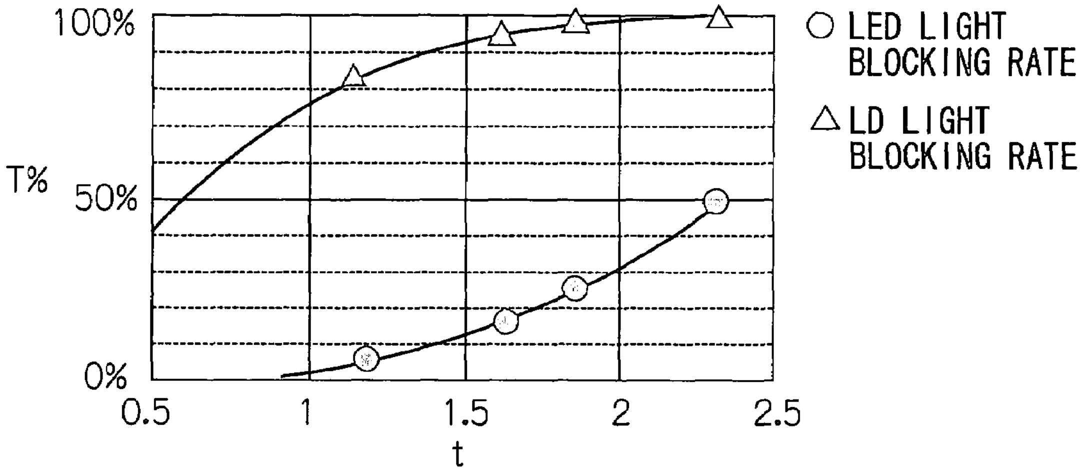
FIG. 9 is a diagram showing the relationship between transmittance and vignetting rate of the first slit relating to the second embodiment.

The relationship between the vignetting rate t by the slit (on the horizontal axis) and the transmittance T of the slit (on the vertical axis) of LD and LED components is shown in FIG. 9. Given that the opening width of the slit is D and the beam diameter at the slit is W, t is expressed as $$t=D/W.$$

As shown in FIG. 9, when the vignetting rate t is 1.5 or less, there is a large decrease in the amount of light of the laser. The shading rate of the LED component is too low to obtain effect clearly when the vignetting rate t exceeds 2.0. The degree of reduction of light amount of laser is significantly large and negative influence due to deflection becomes large when the vignetting rate t does not exceed 1.5. Therefore, it can be judged that a vignetting rate of about 1.5 to 2.0 is appropriate.

The dynamic range of the amount of light which is necessary to reproduce the contrast of a photograph by using a silver salt photosensitive material, is ensured by making the amount of light at the time of driving for the minimum light amount (LED light emission) small with respect to the maximum light amount, because the amount of light at the time of driving for the maximum light amount (LD oscillation) cannot be made large as described above. Here, when considering maintaining of the beam quality, it is preferable to ensure as much as possible the necessary dynamic range in the LD oscillation region.

Given that the maximum emitted light amount is Emax and the emitted light amount in the laser oscillation region is Eth, the dynamic range of the LD oscillation region can be expressed as:

$$\mathrm{Log}E=\mathrm{Log}(E\mathrm{max}/Eth).$$

Figure 10:
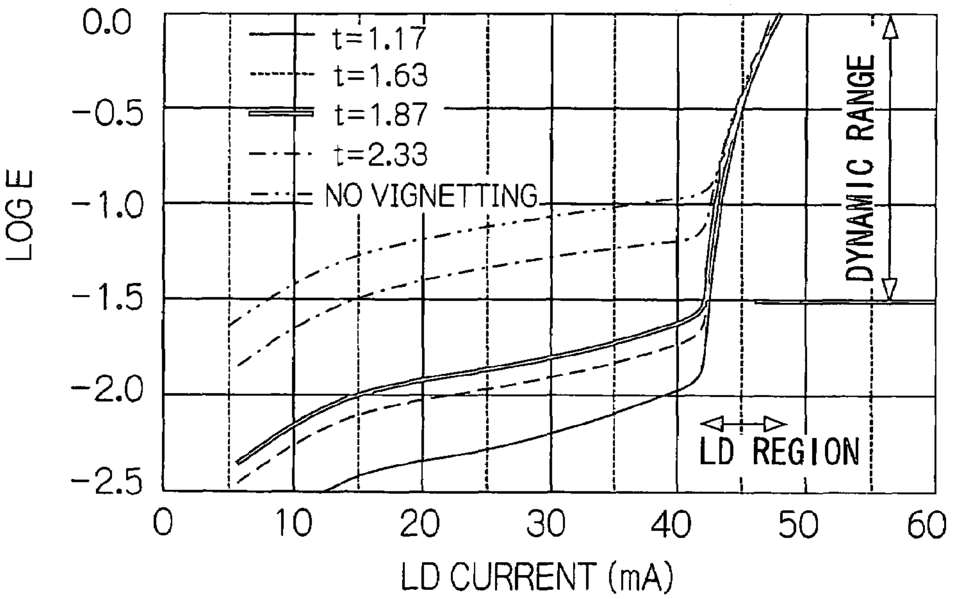
FIG. 10 is a diagram showing the relationship between LD driving current/light amount and the vignetting rate of the first slit relating to the second embodiment.

Here, the relationship between Log E and the vignetting rate t is expressed by the following formula and is as shown in FIG. 10, where α is the spread angle of the beam from the LD 12.

$$t=D/W=D/\{2L\circ\tan(\alpha/2)\}.$$

As shown in FIG. 10, if a slit having a vignetting rate of 1.87 is used, a dynamic range of 1.5 can be ensured in the LD region.

Figure 11:
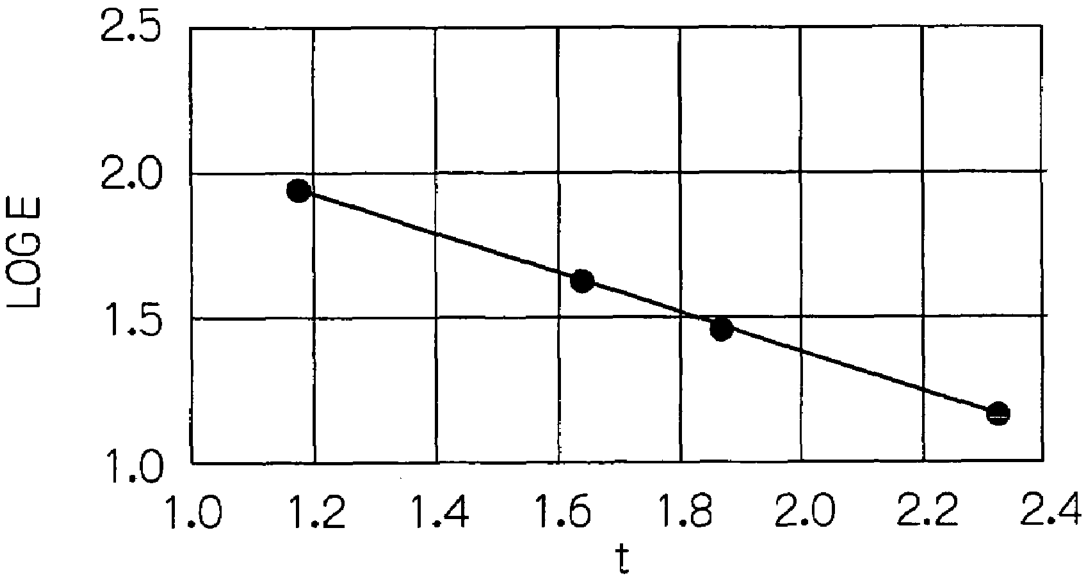
FIG. 11 is a diagram showing the relationship between a dynamic range and the vignetting rate of the first slit relating to the second embodiment.
Figure 12A:
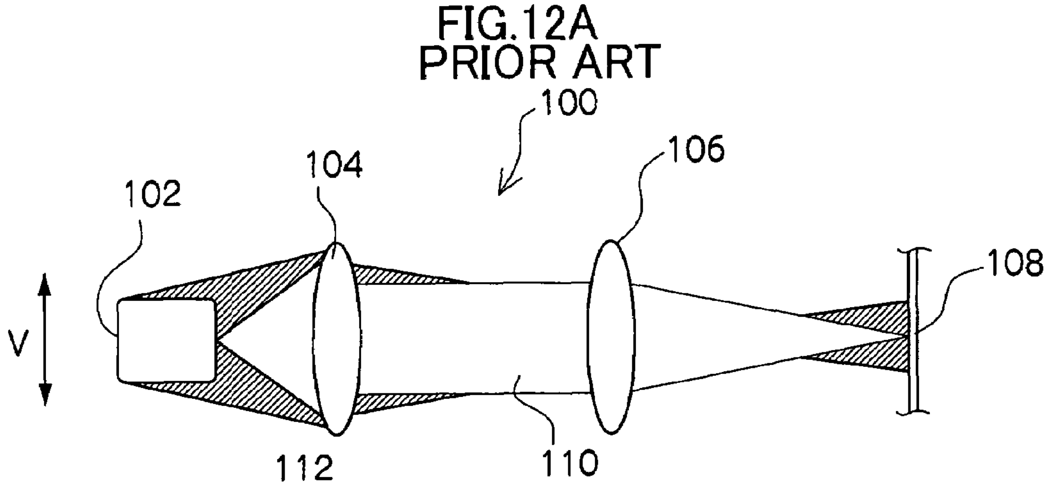
FIG.12A PRIOR ART
FIGS. 12A, 12B, and 12C are side views of conventional exposure devices.
Figure 12B:
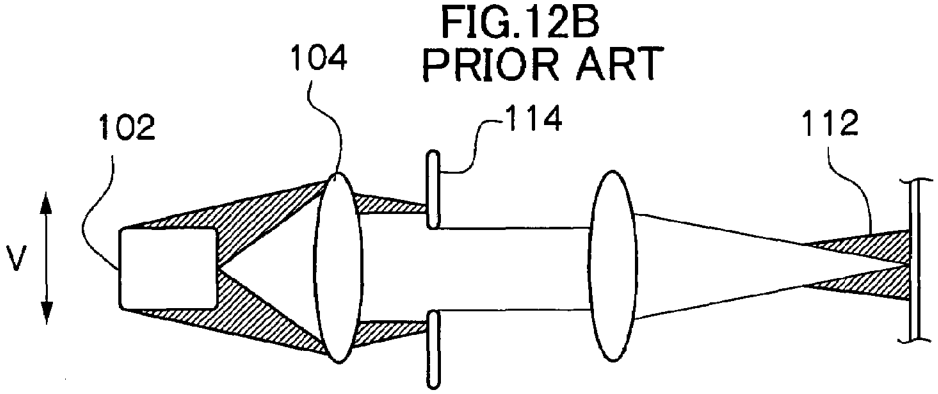
FIG.12B PRIOR ART
Figure 12C:
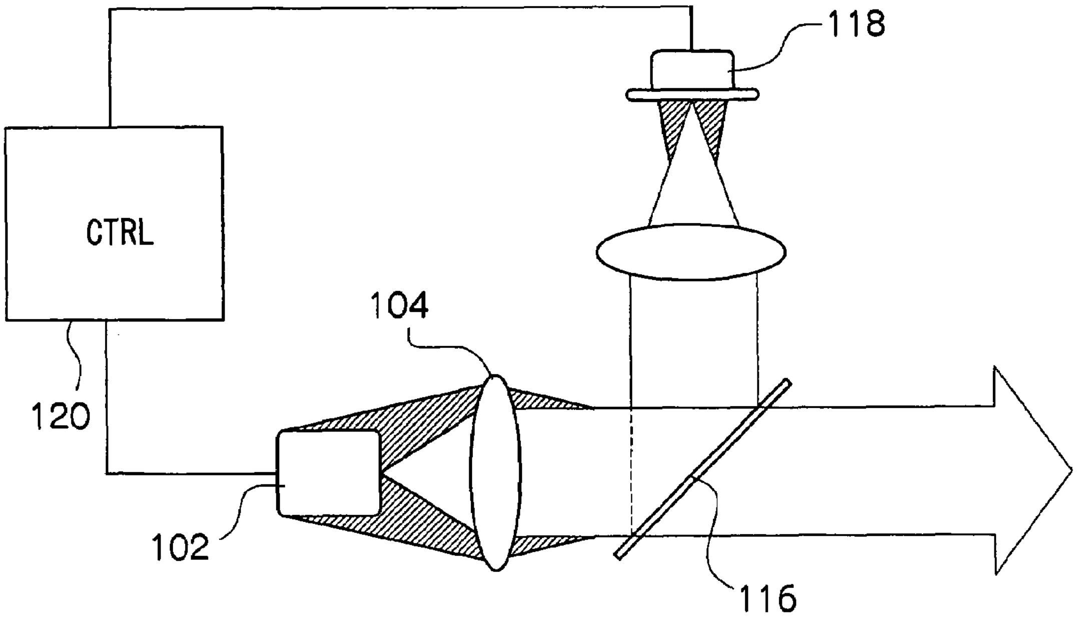
FIG.12C PRIOR ART

The relationship between the vignetting rate t and the dynamic range is shown in FIG. 11. The horizontal axis is the vignetting rate t and the vertical axis is the dynamic range obtained only by the laser oscillation region in FIG. 11.

As can be understood from FIG. 11 as well, in order to ensure a dynamic range (shown on the vertical axis) of 1.5 in the LD oscillation region, it suffices for the vignetting rate t (shown on the horizontal axis) to be 1.8 or less, that is:

$$D/\{2L\circ\tan(\alpha/2)\}\leqq 1.8.$$

Moreover, if the vignetting rate t is made to be smaller than it need be made, the light amount in the laser oscillation region will be insufficient, and even if the dynamic range can be ensured, the absolute amount of light will be insufficient with respect to the sensitivity of the silver salt photosensitive material, and there is the possibility that problems will arise in image formation. Therefore, the vignetting rate t must be set by taking into consideration both the dynamic range and the sensitivity.

Note that a predetermined level of performance of LD 12 and the start of power supply are not simultaneous. There is a time lag till that performance of the LD 12 after the start of power supply and effects due to performing time characteristic needs to be considered. In order to cope with this, the driver circuit is set such that a predetermined level of electric current flows the LD 12, even in the area out of images or the area with no image signal, so as to make the LD 12 illuminate weakly and continuously. The negative effects due to performing time characteristic will be thus ameliorated.

Regarding silver halide color photographic photosensitive materials employed in the above-mentioned embodiments, see U.S. patent application Ser. No. 10/401,893, the contents of which are hereby incorporated by reference.

Because the present embodiment is structured as described above, it is possible to provide an exposure device in which the beam quality is excellent and a sufficient extinction ratio is achieved, and which accords with the characteristics of silver salt photosensitive materials.

Because the present invention is structured as described above, it is possible to provide an exposure device in which the beam quality is excellent and a sufficient extinction ratio is achieved, and which accords with the characteristics of silver salt photosensitive materials.

What is claimed is:

1. An exposure device using a GaN blue semiconductor laser as a light source, comprising:

a first limiting device, which limits a light beam which passes through, is provided between an active layer of the semiconductor laser and a coupling lens which is nearest to the active layer, and the first limiting device comprising a limiting direction being a direction orthogonal to the active layer of the semiconductor laser.

2. The exposure device of claim 1, wherein the first limiting device is relatively movable in the limiting direction to the light source.

3. The exposure device of claim 1, further comprising a second limiting device, which limits a light beam which passes through, is provided after the coupling lens, and the second limiting device comprising a limiting direction being a direction along the active layer of a laser crystal.

4. The exposure device of claim 1, wherein, given that a width of an opening of the first limiting device in the limiting direction is D, a distance from a light emitting surface of the active layer to the first limiting device is L, and a spread angle of a beam from the light emitting surface is α, the exposure device is structured so as to satisfy:

$$D/\{2L\circ\tan(\alpha/2)\}\leqq 2.0.$$

5. The exposure device of claim 1, wherein the first limiting device includes a slit formed in a plate.

6. The exposure device of claim 1, wherein the first limiting device includes a coupling lens whose numerical aperture is set under predetermined conditions.

7. The exposure device of claim 3, wherein the second limiting device is movable in the limiting direction of the second limiting device.

8. The exposure device of claim 3, wherein the second limiting device includes a slit formed in a plate.

9. The exposure device of claim 5, wherein the first limiting device which includes the slit is movable by a moving mechanism having a driving device which combines a stepping motor and a rack-and-pinion gear.

10. The exposure device of claim 8, wherein the second limiting device which includes the slit is movable by a moving mechanism having a driving device which combines a stepping motor and a rack-and-pinion gear.

11. An exposure device using a GaN blue semiconductor laser as a light source, wherein, given that a numerical aperture of a coupling lens nearest to a light emitting surface of an active layer of the blue semiconductor laser is NA and a spread angle of a beam from the light emitting surface is α, the exposure device is structured so as to satisfy:

$$NA\circ\tan(\alpha/2)\leqq 2.0.$$

12. An exposure device which uses a GaN blue semiconductor laser as a light source, and which forms an image by irradiated light irradiated from the GaN blue semiconductor laser onto a photosensitive material using a silver halide, and which carries out gradation expression of the image by controlling a driving current of the GaN blue semiconductor laser and modulating an emission intensity of the irradiated light, wherein a limiting device, which limits a light beam which passes through, is provided between a light emitting point of the GaN blue semiconductor laser and a coupling lens which is nearest to the light emitting point, a limiting direction of the limiting device is a direction orthogonal to an active layer of the GaN blue semiconductor laser, and given that a width of an opening of the limiting device in the limiting direction is D, a distance from a light emitting point of the active layer to the limiting device is L, and a spread angle of a beam from the light emitting point is α, the exposure device is structured so as to satisfy:

$$D/\{2L\circ\tan(\alpha/2)\}\leqq 1.8.$$

13. The exposure device of claim 12, wherein a predetermined driving current is always continuously applied to the GaN blue semiconductor laser, and even in a state in which there is no image signal, the GaN blue semiconductor laser emits light in an LED region.

14. The exposure device of claim 12, wherein the limiting device includes a slit formed in a plate.

15. The exposure device of claim 14, wherein the limiting device which includes the slit is movable by a moving mechanism having a driving device which combines a stepping motor and a rack-and-pinion gear.

16. An exposure device which uses a GaN blue semiconductor laser as a light source, and which forms an image by irradiated light irradiated from the GaN blue semiconductor laser onto a photosensitive material using a silver halide, and which carries out gradation expression of the image by controlling a driving current of the GaN blue semiconductor laser and modulating an emission intensity of the irradiated light, wherein given that a numerical aperture of a coupling lens nearest to a light emitting point of an active layer of the GaN blue semiconductor laser is NA and a spread angle of a beam from the light emitting point is α, the exposure device is structured so as to satisfy:

$$NA\circ\tan(\alpha/2)\leqq 1.8.$$

17. The exposure device of claim 16, wherein a predetermined driving current is always continuously applied to the GaN blue semiconductor laser, and even in a state in which there is no image signal, the GaN blue semiconductor laser emits light in an LED region.

* * * * *